July 16, 1963    M. A. EGGENBERGER ETAL    3,097,488
TURBINE CONTROL SYSTEM
Filed Nov. 3, 1961    2 Sheets-Sheet 2
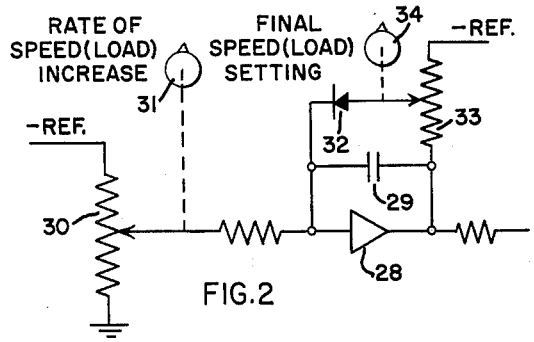
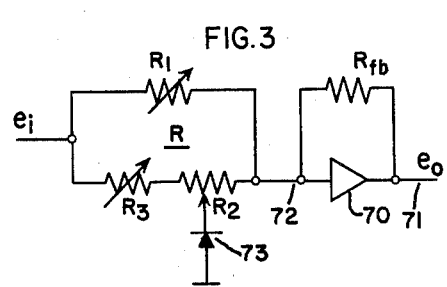
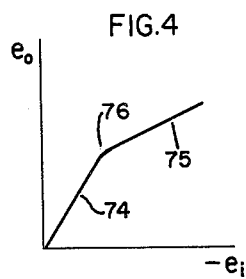
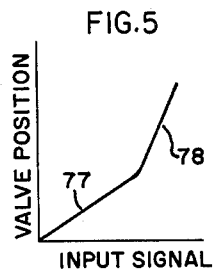
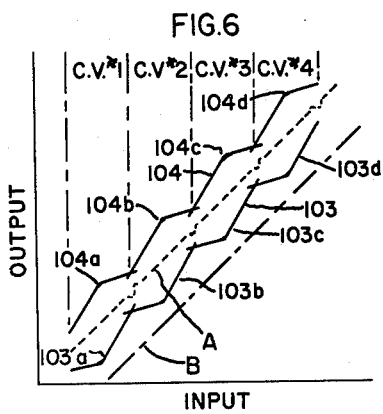
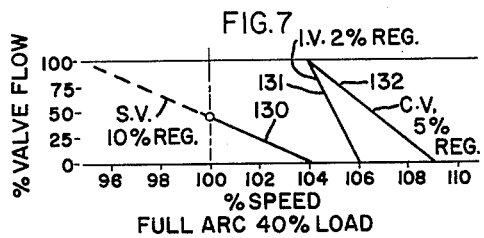
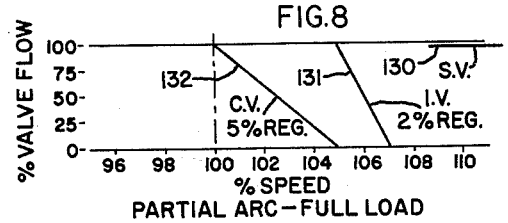
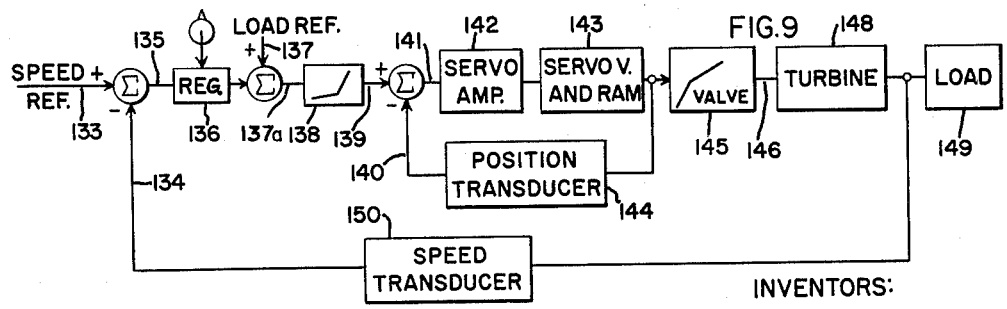
INVENTORS:
MARKUS A. EGGENBERGER
PAUL H. TROUTMAN
PATRICK C. CALLAN
BY W. C. Crutchly
THEIR ATTORNEY.

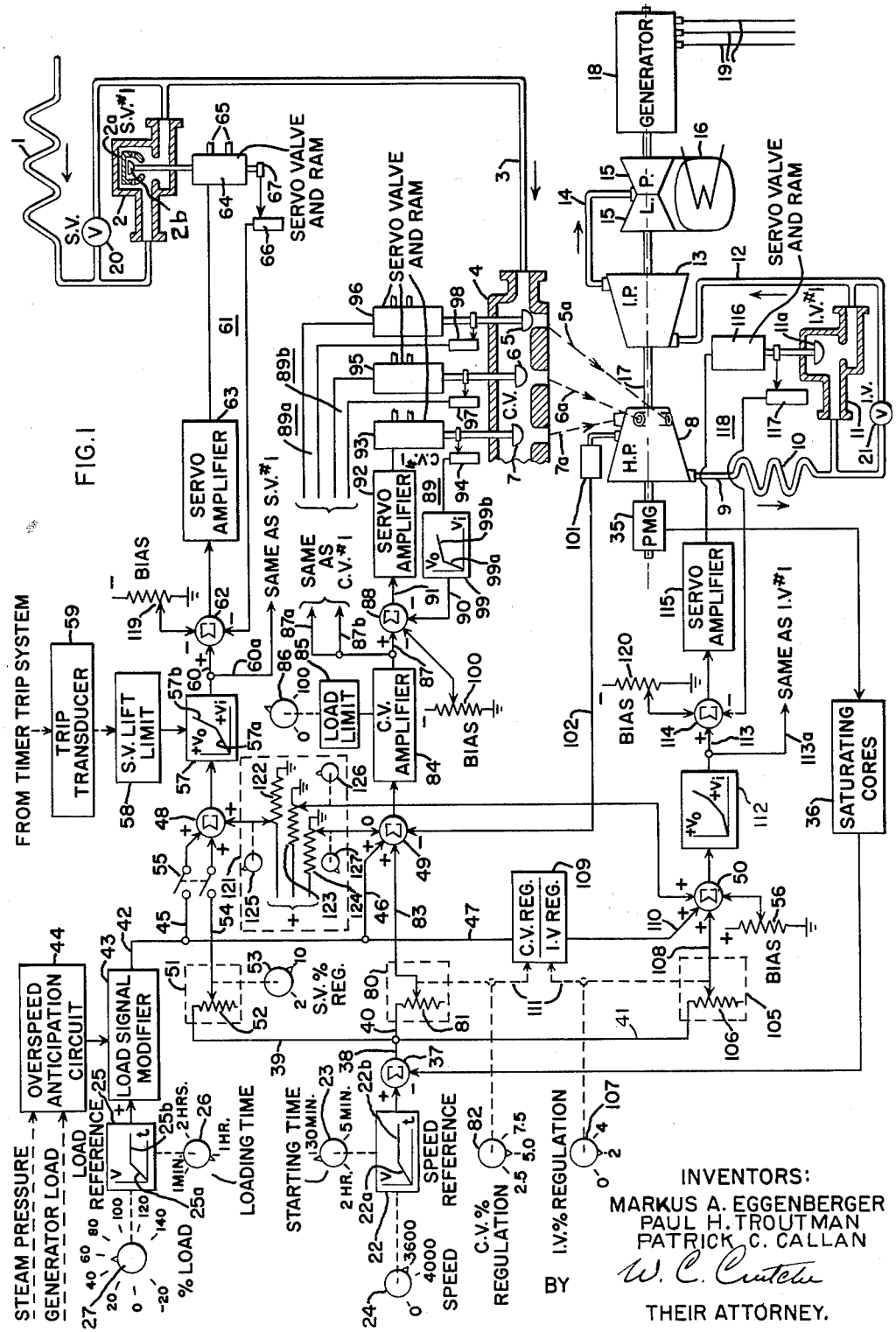

United States Patent Office 3,097,488
Patented July 16, 1963

3,097,488
TURBINE CONTROL SYSTEM
Markus A. Eggenberger, Paul H. Troutman, and Patrick C. Callan, Schenectady, N.Y., assignors to General Electric Company, a corporation of New York
Filed Nov. 3, 1961, Ser. No. 149,910
15 Claims. (Cl. 60—73)

This invention relates to an electro-hydraulic control system for a turbine, such as a reheat steam turbine power plant, with provisions for separate load and speed control under either "full arc" or "partial arc" operation, and with improved valve regulating characteristics.

Every steam turbine must be equipped with a speed control system which includes a speed responsive means, heretofore usually a mechanical governor, connected to operate the steam valves through mechanical linkages or hydraulic components to hold the speed at a desired setting. The "regulation" of the speed control system is defined as the percent speed change required to move the steam valves through full stroke. In servomechanism terminology, the "gain" of the speed error/valve movement transfer function is the reciprocal of the "regulation." When the steam turbine is driving an independent load, such as an electric generator, an increase in the electric load will slow down the turbine, whereupon the speed control system will correct the speed by opening the valves in accordance with the regulation of the speed control system.

When the generator is connected to an electric power distribution system having a number of generating plants, the speed of the turbine becomes fixed by the electrical interconnection with the other generators, whereupon the speed control system serves as a load control system through the use of a "speed changer." In this case, the "regulation" determines the proportion of the total system load which one of the various interconnected turbines will pick up or shed with a given change in system frequency. With the aforedescribed speed/load control systems, where the turbine is connected in parallel with other turbines, speed and load are almost synonymous, and it has been impossible to apply a known percentage of full load separately in precalibrated steps without having it affected by the characteristics of the speed control system, such as the regulation, setting of the speed changer, and the valve flow characteristic.

In large turbine power plants, the steam is often reheated before passing to the next turbine section and, in such cases, an "intercept valve" is generally located between the reheater outlet and the next turbine section. The intercept valve is required to block the continued flow of high energy steam from the reheater to the intermediate pressure turbine after the valves serving the high-pressure turbine have been closed by the speed governor. The intercept valve is usually set to close at a higher speed than the main governing valves, and usually at a faster rate, i.e., with "narrower" regulation. If the same speed governor is used to operate both the main governing valves and the intercept valve, mechanical linkages and hydraulic components are required to obtain the proper correlation between the speed setting of the main governing valves, and that of the intercept valve, and a change of regulation of the governing valves will usually also change the regulation of the intercept valves.

Also, the intercept valve, as well as all of the other steam valves controlling steam flow to the turbine or turbine sections, has nonlinear flow characteristics. In other words, at more throttled valve positions, the incremental change in steam flow per increment of valve travel is much greater than the incremental steam flow per increment of valve travel at more wide-open valve positions. Compensating cams are generally used to modify the valve positioning input in an attempt to obtain steam flow that increases linearly with respect to the positioning input, or, in other words, to obtain a nearly constant incremental gain at all positions of valve stroke. Alteration or adjustment of these compensating cams is usually difficult and expensive. Also, where a group of valves are sequentially operated, the cams are required to provide proper sequencing.

In order to obtain greater turbine efficiency at higher loads, "partial arc" admission through the use of sequentially-operated parallel-connected control valves is generally used. Each control valve controls the flow of steam to a separate "arc" in the nozzle chest, and when one control valve is full open, the next control valve begins to open, admitting steam to another nozzle arc, etc. In addition to the aforementioned nonlinear flow characteristics of each of the control valves, there is an additional nonlinearity introduced at each "intercept" or "changeover point" where the next control valve begins to open. These nonlinearities degrade the overall characteristics of the speed control system.

When the turbine is starting up or operating at low values of load, steam admission through only a portion of the nozzle arcs causes uneven heating, with resulting increased thermal stressing, of the high-pressure turbine. Since there are also generally one or two emergency "stop valves" connected between the steam generating coils and the control valve chest, it has been suggested that the stop valves be equipped with a separate speed/load control system and positioned to control steam flow, while all of the control valves are caused to remain wide open so that steam flows into all of the nozzle arcs in parallel. This is known as "full arc" admission, and apparatus for accomplishing either full arc or partial arc admission at will is disclosed in a copending application Serial No. 843,585, filed in the name of Markus A. Eggenberger on September 30, 1959, now Patent No. 3,027,137, and assigned to the assignee of the present application. The system disclosed there employs two separate mechanical speed governors to position the stop valve and the control valves, and requires mechanical linkages operating from the two speed governors.

Another copending application, Serial No. 80,290, filed in the names of M. A. Eggenberger, P. H. Troutman and Josef Sauter on January 3, 1961, discloses an electro-hydraulic long-range governor for bringing the turbine up to speed and governing the load with the stop valve, resulting in full arc admission, while a second (mechanical) governor is used to control load with the control valves when operating with partial arc admission. There, an electric reference signal supplied to the electro-hydraulic long range governor is used to increase the speed at a preselected rate up to a preselected speed. However, no provisions are made for operating also the control valves and the intercept valve from the same reference signal.

Accordingly, one object of the present invention is to provide an improved electro-hydraulic control system for a steam-turbine-generator where, at rated speed, the addition of load may be effected independently of the regulating effects of the speed control system.

Another object of the invention is to provide an electro-hydraulic speed/load control system for a reheat turbine where the primary governing valves and the reheat intercept valves are correlated both as to regulation and speed range by a simplified electrical system.

Another object is to provide an improved means for introducing electrically generated nonlinear compensation for nonlinear valve position/steam flow relations.

Still another object is to provide a turbine control arrangement giving improved operating characteristics at the "intercept" points in sequentially-operated, parallel-connected control valves supplying separate nozzle arcs in a steam turbine.

A still further object is to provide an improved means for speed/load governing of a turbine where speed is measured by a single electric speed responsive means, governing by means of either the control valves or stop valves for "partial arc" or "full arc" admission, respectively.

Another object of the invention is to provide a simplified control system for changing from full-arc to partial-arc admission and back again.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a schematic diagram, in simplified form, of the turbine control system;

FIG. 2 is a simplified schematic diagram of an electrical device or function generator suitable for generating either a speed or load reference signal;

FIG. 3 is another function generator suitable for generating a nonlinear compensating function for the steam valves;

FIGS. 4–6 are graphs illustrating the application of the compensating functions;

FIGS. 7–8 are diagrams of the regulating characteristics of the various valves at full arc and partial arc respectively; and FIG. 9 is a simplified block diagram illustrating the division of speed and load reference signals as applied to a single valve.

Briefly stated, the invention is practiced by providing a turbine having each valve separately positioned by a closed loop electro-hydraulic servo means in accordance with an electric input signal. An electrically-generated nonlinear function is superimposed either on the electric valve position input signal or on the valve position feedback signal, so as to obtain substantially linear steam flow characteristics. A speed reference signal, which may be a voltage adjustable in value corresponding to the speed to be maintained, is summed with a turbine speed feed-back signal representing actual speed of the turbine to provide a speed error signal which is supplied to the control mechanism of the stop valves, the control valves, and the intercept valves in parallel. A separate load reference signal is summed with the error signals in each of the parallel branches feeding the valves, after a gain factor (representing valve regulation) has been applied to the error signal. Bias signals applied at the load summing points in the parallel branches serve to transfer between partial and full arc operation. In the case of the control valve branch, an additional feedback signal representing steam pressure at the downstream side of the control valves is employed to substantially remove the nonlinearity introduced by changeovers between each of the sequentially-operated control valves.

The major advantages achieved by the foregoing arrangement are: improved linearity of steam flow with speed and load variations, independent addition of load through a precalibrated dial, and use of easily adjustable transfer between "partial arc" and "full arc" operation, and addition of load or increase of speed at an adjustable rate.

Turbine Generator Power Plant

Referring to FIG. 1 of the drawing, the power plant is furnished with high-pressure steam originating in steam generating coils 1 shown in the upper right-hand corner of the drawing, in the boiler and passing through a stop valve 2 of the type having a main valve disk 2a and an internal bypass disk 2b. The steam flows through pipe 3 to the control valve chest 4 which is usually situated on the turbine but which is shown here separately in order to illustrate the operation of the control valves, some of which are shown as 5, 6, 7. Each of the control valves 5–7 controls the flow of steam to a separate nozzle arc (not shown) in the high-pressure turbine 8, as indicated by the dashed lines 5a–7a. The steam leaves the turbine through pipe 9 and is reheated to substantially the original temperature in reheat coils 10, whereupon it flows through intercept valve 11 having a valve disk 11a. From intercept valve 11, the steam flows through pipe 12 to an intermediate pressure turbine 13, and from there through crossover pipe 14 to low-pressure turbine sections 15, and thence to condenser 16. The turbine sections 8, 13, 15 are shown coupled in tandem on a single shaft 17, but they could also be "cross compound" units on separate shafts. The turbine sections drive a load, such as a generator 18 furnishing power to an electrical system through phase leads 19.

One or more additional stop valves may be connected in parallel with stop valve 2 as indicated at 20, and also one or more intercept valves may be connected in parallel with intercept valve 11, as indicated at 21. The construction and operation of the additional stop valve 20 and intercept valve 21 would be essentially similar to the ones shown in detail.

The turbine power plant is shown operating on partial arc admission. The stop valve 2 is wide open with the small pilot valve disk 2b holding the main valve disk 2a fully open. The control valves 5, 6, 7 are governing the load on the turbine by sequentially admitting steam to the separate nozzle arcs in high-pressure turbine 8. In the drawing of FIG. 1, control valve 7 (C.V. #1) is wide open and control valve 5 is shown closed. Control valve 6 is in an intermediate position here and is doing the governing. Intercept valve 11 is wide open so as not to impede the flow of reheated steam to the intermediate-pressure turbine 13.

If the turbine power plant were shown in full-arc operation, the regulating roles of stop valve 2 and control valve chest 4 would be reversed. That is, the control valves 5–7 would all be opened wide so that the steam would flow in parallel to the separate nozzle arcs. Intercept valve 11 would again be open as shown in the drawing; and the main valve disk 2a of stop valve 2 would be closed, resting on its valve seat, with the bypass valve disk 2b in an intermediate-open position and controlling the flow of steam to the control valve chest 4.

Speed and Load Reference Units

In order to provide a reference signal representative of the desired turbine speed, a speed reference unit indicated as block 22, shown at the left-hand side of the drawing, is employed, which generates an electric potential V with respect to time t, as indicated by the graph shown inside block 22. It will be seen that the voltage V first is integrated so as to increase with respect to time t to form a "ramp" signal 22a and thereafter to provide a constant reference voltage of magnitude according to the desired speed as indicated by 22b. The gradient of the ramp which is indicative of the time to bring the turbine from standstill to rated speed is adjusted by the "starting time" control knob 23. The constant final speed reference voltage, indicating the desired steady state speed of the turbine, is set by the "speed" control knob 24. It will be appreciated that the reference ramp 22a could be arranged with two different slopes to accelerate the turbine more rapidly through "critical" speeds.

The load reference unit indicated as block 25, shown at the upper left-hand corner of the drawing, generates the same sort of signal as the speed reference unit 22, comprising a ramp 25a and a final constant reference voltage 25b of magnitude according to the desired load. The gradient of ramp 25a, representing the time desired to fully load the turbine, is adjusted by "loading time" control knob 26, while the constant load reference voltage represented by 25b (indicative of the percent of full load that it is desired for the turbine to carry) is adjusted by the "load" control knob 27.

The exact physical construction of the speed reference unit and the load reference unit is immaterial, so long as they both provide an integration of the reference voltage with respect to time and then provide a constant reference voltage which is accurate and reliable within the requirements of the particular turbine power plant. In some cases, the time integration portion will be unnecessary and the reference voltages can be applied manually or by some external device such as a computer. The reference units can comprise a potentiometer driven by a motor with a variable-ratio drive or can comprise an integrating operational amplifier with a suitable voltage limiting device.

FIG. 2 illustrates an operational amplifier suitable either for speed reference unit 22 or load reference unit 25. It comprises a high gain D.-C. amplifier 28, which may be of the solid state or vacuum tube type. This D.-C. amplifier might, for instance, be of the type shown in chapter 5 of Electronic Analog Computers by D. A. Korn and T. M. Korn, McGraw-Hill, New York, 1952. A capacitor 29 in the feedback causes the device to function as an integrator of the input voltage with respect to time and at a rate determined by the magnitude of the input voltage for any given input resistor and feedback capacitor values. The input voltage is set by a potentiometer 30 connected to a source of voltage (not shown), so that the rate of integration (or gradient of the ramp) can be set by adjusting manual control knob 31, corresponding to either the "starting time" knob 23 or the "loading time" knob 26 of FIG. 1. The output voltage is limited by diode 32 acting in conjunction with potentiometer 33, which is adjusted with manual control knob 34. When the output voltage rises to a value determined by the setting of potentiometer 33, capacitor 29 is bypassed and the device stops integrating and holds a constant output voltage. The manual control knob 34 is, of course, comparable to either the "speed" knob 24 or the "load" knob 27 in FIG. 1.

*Speed Control Loop—General*

The speed reference unit and the load reference unit both provide reference signals for three parallel control branches containing the stop valves, the control valves, and the intercept valve respectively. The speed reference signal is compared with an actual speed feedback signal to produce a speed error signal which thereafter goes to each of three parallel branches 39, 40 and 41. The load reference, on the other hand, is summed with the speed error signal in each of the three parallel branches separately, each having an individual summing device 48, 49 and 50, according to one feature of the invention.

In referring to FIG. 1, the operational amplifiers used produce a polarity inversion of the voltage. In order to prevent confusion, the plus and minus signs indicated on the drawing are according to conventional servomechanism usage (see "Servomechanisms and Regulating System Design" by Chestnut and Mayer, 2nd Ed., 1952) and are not necessarily indicative of the actual polarity of the voltages applied.

In order to provide an indication of actual turbine speed, a speed responsive means, such as a permanent magnet generator 35, is shown driven by the turbine shaft 17, which produces an A.-C. voltage having a frequency proportional to turbine speed. For example, the generator 35 may comprise a 1.8-kva., 115-v., 3-phase permanent magnet generator, having 14 poles, so as to produce a 420-cycle per second A.-C. voltage for a 3600-r.p.m. turbine. The generated A.-C. voltage is converted to a D.-C. signal by the saturating magnetic cores 36 to provide a feedback voltage signal proportional to frequency (i.e. turbine speed). This speed feedback signal, having a sign opposite to that of the speed reference signal, is summed at 37 to produce a speed error signal in line 38. The speed error signal in line 38 is furnished to the three parallel-connected lines 39, 40, 41 serving the stop valve 2, control valve chest 4, and intercept valve 11 respectively with speed error signals.

The load reference signal is supplied through line 42 after first passing through a load signal modifier 43 supplied by the overspeed anticipation circuit 44. Overspeed anticipation circuit 44 is not normally active and is used to prevent overspeeding when combined conditions in the turbine and generator load produce a cumulative tendency to overspeed the turbine, and acts to anticipate this event.

The load reference signal in line 42 is furnished to parallel connected lines 45, 46, 47, which serve to superimpose the load reference signal on the speed error signal in summing devices 48, 49, 50 respectively.

*Stop Valve Branch*

It will be first assumed for purpose of illustration that the stop valve 2 is controlling the steam flow on full-arc admission with the pilot valve disk 2b in an intermediate position, rather than being in the full-open position as shown in FIG. 1. The speed error signal in lead 39 is modified by multiplier 51 comprising a potentiometer 52 set by "stop valve regulation" control knob 53. This multiplies the speed error signal by a coefficient which is indicative of the desired regulation of the stop valve under the influence of speed changes. In other words, multiplier 51 adjusts the gain of the stop valve loop.

The modified speed error signal appears in lead 54. Ganged switches 55 are shown in the open position, since the figure indicates the turbine on partial-arc rather then full-arc admission. For the purpose of explaining the operation of the stop valve on full arc admission, however, it is assumed that switches 55 would be connected to leads 45, 54 so as to supply the load reference signal and the modified speed error signal to the summing device 48.

The superimposed speed and load signals at the output of summer 48 provides the input for a function generator shown diagrammatically as block 57, where they are further modified according to the graph shown in block 57. There it will be seen that an incremental increase of output voltage $V_o$ per incremental increase of input voltage $V_i$ is rather low over the first part of the curve 57a and rather high over the remaining portion of the curve 57b. The function shown is utilized substantially to compensate for the nonlinear flow characteristics of the stop valve and is selected to be approximately proportional to the reciprocal function of the valve flow characteristics. When a number is multiplied by its reciprocal, the result is equal to one, therefore such a compensating function, when multiplied by the valve position/steam flow characteristic function, produces an approximately linear output of steam flow with respect to input voltage, or expressed in another way, produces a constant gain. Reference to FIG. 3 of the drawing will indicate a typical component of function generator 57, which generates the compensation for valve flow characteristics. Different symbols are used in FIG. 3 for input and output values, since function generator 57 may also include additional stages of amplification and/or polarity inversions. FIG. 3 shows a high gain D.-C. amplifier 70 which may be similar to D.-C. amplifier 28 of FIG. 2, having a feedback resistor $R_{fb}$ connected from the output lead 71 to the summing junction 72. A negative D.-C. input voltave $e_1$ is furnished through an input impedance network shown generally as R to provide a positive D.-C. output voltage $e_o$. The gain of such a device $(e_o/e_1)$ is equal to $-R_{fb}/R$ or, in other words, is proportional to the reciprocal of the input impedance.

The input impedance R comprises a parallel circuit having an adjustable resistance $R_1$ connected in parallel with series-connected adjustable resistance $R_3$ and potentiometer $R_2$. The tap of potentiometer $R_2$ is connected through diode 73 to ground. When the input $e_1$ is low, input current will flow through both parallel branches of input impedance R. This provides a low input impedance and the incremental increase of output voltage with each increase of input voltage (or gain) will be relatively high. When the input voltage has reached a value such that the "break" voltage of diode 73 is exceeded, diode 73 will begin to conduct in the forward direction and thereafter the effective input impedance is substantially equal to $R_1$. With this high input impedance, the incremental increase in output voltage for each increase in input voltage will be relatively low.

A graph of the function produced by the component of FIG. 3 is shown in FIG. 4. There the function comprises a relatively steep initial linear portion 74, connected with a linear portion 75 of lesser gradient. The two lines are connected at a "knee" 76, which is somewhat rounded due to the characteristics of diode 73 at the break point. The function of FIG. 4 closely approximates the steam flow characteristics of a valve and, when the resistances $R_1$, $R_2$, and $R_3$ are correctly selected, the flow characteristics of a valve can be approximated. Of course, the simple two-branch input impedance of FIG. 3 could be modified to provide three or more branches so as to produce a more rounded curve than the one shown in FIG. 4.

When the component of FIG. 3 is connected in the feedback circuit of an additional D.-C. amplifier, similar to amplifier 70, a reciprocal curve as indicated in FIG. 5 is the result. There it is seen that the initial portion 77 of the curve has a relatively shallow slope, while the latter portion 78 of the curve has a steeper slope.

Since the compensation (function generator 57) for the stop valve operating characteristics is part of the forward transfer function, the function generator 57 employs a curve of the general shape shown in FIG. 5 with the low slope or low gain for low magnitudes of input signal, and a steep slope or high gain for greater values of input signal. This is proportional to the reciprocal of the valve position/steam flow relationship.

Returning to FIG. 1, a stop valve lift limit circuit 58 limits the movement of the stop valve to its permissible operating range and an emergency trip transducer 59 from the emergency trip system serves as overspeed protection. The details of stop valve limit 58 and trip transducer 59 are not material to the present invention.

The stop valve positioning input signal now appears in lead 60 and it comprises a speed error signal modified by a "regulation" factor with a desired load signal superimposed thereon, and further modified by the nonlinear function generator 57, so as to be nonlinear also. A similar stop valve positioning input signal may be supplied to a parallel connected stop valve such as stop valve 20 through the parallel connected lead 60a. However, the details of the parallel-connected valve positioning subloop are omitted since they would be essentially the same as the ones shown for stop valve 2.

The stop valve is positioned by a servosystem comprising a closed subloop shown generally as 61. The valve positioning input signal in lead 60 passes through summing device 62 and is amplified in servo amplifier 63, which may be one of many types commercially available. For example, servo amplifier 63 may be a solid state D.C. power amplifier for providing D.C. current of either polarity in accordance with the polarity and magnitude of a valve position error signal appearing at the output of summing device 62. The amplified valve position error signal is supplied to an electro-hydraulic servo valve and valve positioning ram indicated at 64. The ram is supplied with high-pressure oil through pipe 65 from a source of hydraulic fluid (not shown), having sufficient power to operate valve disks 2a, 2b. The details of the servo valve and ram are not pertinent to the present invention, but one suitable servo valve and ram combination is disclosed in U.S. Patent 2,977,768, Wagner et al., issued April 4, 1961, and assigned to the assignee of the present application.

A valve position negative feedback signal is derived from valve position transducer 66, which is operated when the ram moves by an extension 67 on the ram. Transducer 66 may be of any suitable type and its construction is not material to the present invention. It can consist of a simple potentiometer voltage divider supplied with a minus reference voltage. Preferably, however, it consists of a variable reluctance extensiometer supplied with a suitable high-frequency A.C. excitation, and providing an A.C. signal having a magnitude and phase representing valve position, which is then demodulated to provide a D.C. feedback signal of the proper polarity. A position transducer and demodulator suitable for transducer 66 is described in the aforementioned application Serial No. 80,290, Eggenberger et al.

The position assumed by valve disk 2b, of course, controls the flow of steam to high-pressure turbine 8 and thus the speed or load of the turbine. The main speed loop is closed by the speed sensing permanent magnet generator 35, which, together with saturating cores 36, furnishes an electric potential representing actual speed signal. This actual speed signal is summed with the speed reference signal at 37 to provide a new speed error signal in lead 39.

Control Valve Branch

The control valves control the flow of steam under partial-arc admission as shown in FIG. 1 of the drawing. The control valve speed error signal appearing in lead 40 is modified by a multiplier 80 comprising a potentiometer 81 adjusted by the "control valve regulation" knob 82. As mentioned previously in connection with the stop valve regulation, the control valve regulation knob 82 changes the gain in the control valve speed error signal or, in other words, serves to adjust the regulation of the control valves for incremental changes in speed. The modified speed error signal appears in lead 83 and is summed with the load signal of lead 46 in the summing device 49. The resulting modified speed error/load signal is amplified in the control valve amplifier 84, which is a conventional D.C. operational amplifier, similar to amplifier 70 of FIG. 3.

An electrical circuit 85 for limiting the load on the turbine is adjusted by knob 86. The details of load limit 85 are not material to the present invention. The amplified speed/load signal is applied from lead 87 to summing device 88. The summing device 88 provides a valve positioning error signal for a control valve positioning subloop shown generally as 89. Parallel leads 87a, 87b, etc. carry the amplified speed/load signal to each of the separate control valves in other control valve positioning subloops, shown generally as 89a, 89b, etc., which are the same as subloop 89 to be described. The valve positioning error signal appears in lead 91 at the output of summing device 88 and is amplified in a servo-amplifier 92. The amplified signal operates a servo-valve and ram 93. A position transducer 94 provides a negative feedback signal to summer 88. The details of servo amplifier 92, servo valve and ram 93, and position transducer 94 are similar to the analogous units discussed with reference to the stop valve subloop 61, except they are modified in size and power requirements commensurate with the size of the control valve 7 to be operated as will be apparent to those skilled in the art. Additional servo valves and rams 95, 96 and position transducers 97, 98 are shown for control valves 5, 6.

In each control valve position feedback lead such as 90 connected between transducer 94 and summer 88, there is a function generator indicated by block 99 which generates a non-linear compensating function according to the graph shown in block 99. This may be produced by a component similar to the one shown in FIG. 3; however, it will be observed that the function is inverted, with the steeper slope 99a (higher gain) at the low magnitudes of input voltage and shallower slope 99b (lower gain) at higher magnitudes of input voltage. This is necessary because function generator 99 is placed in the feedback portion of the control valve positioning subloop. Thus, the reciprocal of this function will be present in the forward transfer function of the subloop and valve disk 7 will assume a position in relation to the valve positioning input signal in lead 87 as shown by the graph of FIG. 5.

In order to obtain the proper opening and closing sequence of control valves 5 to 7, negative bias signals comprising electric potentials of varying magnitude are superimposed on the valve positioning signals. Such a bias signal is indicated by the potentiometer 100 supplied by a voltage source (not shown) and which supplies an adjustable bias signal to summing device 88. Similar bias adjustments (not shown) are provided for the other control valves. Each such bias is of a greater magnitude than the preceding one, and also of a polarity opposite to that of the valve positioning signal. Therefore, the valve positioning signal in each of the leads 87, 87a, 87b must overcome the biases in sequence before the valve positioning signals commence to open the control valves. Thus the control valves are caused to operate sequentially by means of easily adjustable electric bias signals rather than operating from a common actuator and employing cams or other such sequencing devices of the prior art structures.

The sequentially operated, parallel-connected control valves control the flow of steam to high-pressure turbine 8 and therefore also together control the first-stage pressure. This first-stage pressure is sensed and converted into a corresponding negative feedback signal by a pressure transducer 101. Pressure transducer 101 may be of any suitable type commercially available and is responsive to first-stage pressure to produce an electric potential proportional to the pressure. A suitable transducer for this use would be of the strain gage type as disclosed in the aforementioned Wagner et al. Patent 2,977,768. The pressure feedback signal from transducer 101 is returned via pressure feedback lead 102 to summing device 49 and is used to reduce the variations in gain occurring when each control valve starts initially to open in a manner which will be understood by those skilled in the art.

FIG. 6 of the drawing graphically illustrates the operation of the pressure feedback in conjunction with the nonlinear feedback compensation for each control valve separately. The graph indicates the input variable on the horizontal axis and output variable on the vertical axis. Curve 103 indicates the valve position (output) of the valve positioning subloops in terms of the valve position signal (input) in leads 87, 87a, 87b of FIG. 1. Curve 103 indicates nonlinear portions 103a, 103b, etc. for each of the control valves, the nonlinearity having been produced as explained by function generators similar to 99 in each valve positon subloop feedback. The various portions 103a, 103b of curve 103 are displaced along the horizontal axis in accordance with the magnitudes of bias voltages supplied to the summing devices 88 in each line 87, 87a, 87b, etc. to provide operation of the valves 5, 6, and 7, in proper sequence. The curves are also displaced vertically so as to show their correlation with the total output in steam flow caused by the additive effect of the signals.

Curve 104 represents the steam flow (output) of each of the control valves in terms of the valve position (input) of each of the control valves. Each of the portions 104a, 104b, etc. represents the flow characteristics of a separate control valve and is the conjugate or reciprocal of the corresponding valve positioning function directly below it. Curves 104a, 104b, etc. are displaced horizontally and vertically so that each is disposed above the corresponding curve 103a, 103b.

The product of curves 103, 104 is represented by dashed line A, which represents steam flow (output) in terms of the valve positioning signal (input). It will be seen that curve A is almost a straight line, meaning that an almost linear relationship has been obtained through the use of the electrical compensating circuits for each control valve, and therefore that steam flow is proportional to valve input signal.

It will be observed, however, that there are slight discontinuities or irregularities in curve A at points where the valve operations overlap. Considering curve A as a single function, these irregularities are substantially removed through the use of the pressure feedback signal via lead 102, since the first-stage pressure is not significantly affected by the changeover between control valves. The pressure feedback thus stabilzes the signal and removes these irregularities to produce a substantially straight line, as indicated by the curve B in FIG. 6. Thus, the overall steam flow admitted by the control valves will be substantially linear with respect to the modified speed error/load signal introduced at summing device 49.

When the control valves 5, 6, 7 are controlling the admisison of steam, any variation in speed is again detected by permanent magnet generator 35 and the actual speed is compared with the speed reference in summer 37 as described previously, with the new speed error signal appearing in lead 40. Thus the "control valve branch" described above forms an alternate means of pirmary steam control in the overall speed control loop.

*Intercept Valve Branch*

The arrangement of the intercept valve branch is essentially similar to that of the stop valve branch. The speed error signal in lead 41 is modified by the multiplier 105 which comprises a potentiometer 106 set by the "intercept valve regulation" knob 107. Multiplier 105 adjusts the desired speed regulation of the intercept valve as described before. The modified speed error signal appears in line 108 and the load signal is superimposed thereon in summing device 50. Provision is also made for introducing an additional positive bias into summer 50 as indicated at 56.

The load signal in lead 47 is preferably modified by another multiplier circuit 109 before it is applied to the summer 50 through lead 110. Circuit 109 consists of potentiometers which are adjusted either by the control valve regulation knob 82 or the intercept valve regulation knob 107, as indicated by the dotted lines 111. The circuit is so arranged that it always multiplies the load signal in line 47 by a factor which is the ratio of the control valve regulation divided by the intercept valve regulation. This is done in order to remove the necessity for resetting the intercept valve bias 56 to produce the proper intercept valve sequence with each new control valve regulation setting. The combined modified speed error/load signal then passes through a function generator 112, similar to the aforedescribed stop valve function generator 57. The valve positioning nonlinear input signal appears in lead 113, is summed with the valve position feedback signal at 114, and the resulting valve position error signal is amplified by servo amplifier 115. The amplified signal operates servo valve and ram 116 and a feedback signal indicating valve position is produced by position transducer 117 and returned to summer 114. The foregoing summer, servo amplifier, servovalve, ram and position transducer comprise intercept valve positioning subloop 118. Additional intercept valves, such as valve 21, may be operated in similar servo subloops by valve positioning signals in leads such as 113a connected in parallel with lead 113. In order to properly calibrate the operating speed range of the stop valves and intercept valves with the control valves, provisions are made for introducing additional bias signals as indicated at 119, 120 respectively.

Full Arc—Partial Arc Transfer

As suggested previously, either the stop valves 2, 20 control the steam flow with full-arc admission, or the control valves 5, 6, 7 control the steam flow with partial-arc admission. In either case, the intercept valve 11 also acts in conjunction with whichever primary steam admission valve happens to be active. Transfer between full-arc and partial-arc admission with proper correlation of the speed ranges of the valves is accomplished by means of the transfer circuit indicated by block 121. Transfer circuit 121 provides means to apply selected supplementary valve opening bias voltages to summing devices 48, 49, 50. Transfer circuit 121 comprises potentiometers 122, 123, 124 connected to a suitable bias voltage source (not shown) and applying opening biases to the operating mechanisms of the stop valves, intercept valves and control valves respectively. The taps on bias potentiometers 122, 123, 124 are adjusted by knobs 125, 126, 127 respectively.

The transfer circuit 121 is shown in the partial-arc position with full transfer bias voltage applied to stop valve summer 48, so that the stop valve 2 is wide open, and with zero bias applied to the control valve summer 49. The intercept valve has a relatively high fixed opening bias due to the setting of potentiometer 56. It will be apparent that by adjusting the control knob 127, the transfer bias voltage can be applied to the control valve branch in summer 49. Similarly, by adjusting knob 125, the transfer bias voltage can be removed from summer 48 in the stop valve branch. Knob 126 is used to adjust the magnitude of bias applied to the intercept valve branch in summer 50 and is selected so that the intercept valve will start closing at the point where the primary steam admission valve, either control valve or stop valve, as the case may be, has just reached its closed position. Potentiometers 122, 123, 124, therefore determine the average speed range over which the respective valves operate (see FIGS. 7 and 8).

In order to prevent unnecessary regulating movements of the stop valve main disk 2a when in partial-arc operation, the ganged switches 55 are used to remove the varying speed and load signals from summing device 48 so that the stop valves remain wide open, under constant full-open bias, as indicated.

Operation and Advantages

FIGS. 7 and 8 indicate the speed/valve flow relations at specific load conditions. FIGS. 7 and 8 are confined to specified load settings, since the superimposed load reference signals representing load are independently applied and would only change the valve positions if turbine speed is held constant. FIG. 7 illustrates operation on full-arc admission, which would be utilized at a relatively low turbine loading such as the 40% load condition shown in FIG. 7. FIG. 8 illustrates operation on partial-arc admission at full load. For each speed indicated on the horizontal axis at the load setting specified, there is a corresponding percent of total valve flow as indicated on the vertical axis.

In FIG. 7, the stop valve is controlling at 40% of full flow at 100% speed with a regulation of 10% as indicated by diagonal line 130. The stop valve is not allowed to open any further, in order to keep control by the bypass valve 2b, rather than by the main stop valve disk 2a. Upon increase in speed, just as the stop valves go closed at 104% of full speed, the intercept valve indicated by diagonal line 131 commences to close and is fully closed at 106%. This acts as a pre-emergency governor to block off reheat steam from the turbine before it overspeeds and trips the mechanical emergency governor, which would shut the turbine down. The control valves, indicated by line 132, also start closing at 104%, with a 5% regulation. They would normally have no effect on the primary steam flow when operating on full arc admission, but act as a second line of defense against overspeed. The horizontal displacement of intercept valve and control valve curves 131, 132 towards the higher speed ranges is caused by the transfer biases applied by transfer circuit 121, as explained previously.

FIG. 8 represents the turbine under partial-arc admission at full load. The lines 130—132 are for the same valves as in FIG. 7. However, it is seen that the control valve line 132 has shifted to the left. Since the turbine is stated to be at full load, the control valves are shown at 100% flow at rated speed of 100%, with a regulation of 5% as before. Just as the control valves go closed at 105% of rated speed, the intercept valves, indicated by line 131, commence to close with a fairly narrow regulation of 2%, and are fully closed at 107% of rated speed. The stop valve is full open at all speeds as indicated by line 130, due to the constant full-open bias as indicated in FIG. 1. Of course, the specific regulations shown, as well as the speed ranges, can be easily changed by simple potentiometer adjustments.

An important feature of the control system is the separation of speed and load reference signals. Since the load reference signal is superimposed on the speed error signal after it has been modified by the valve regulating adjustment, it is possible for the first time to put a calibrated dial on the load control and, at rated speed, to add a preselected percentage of full load to the turbine at a predetermined rate while it is connected to a large system. Previously, the provisions for adding load have been so intimately associated with the speed control provisions that the "regulation" of the valve with speed changes also affected the load-introducing means. Therefore, the load control could not be calibrated.

Reference to the simplified block diagram of FIG. 9 will indicate how the load reference is here divorced from the speed regulating function. FIG. 9 shows a simplified block diagram for only one valve, with the additional valves in the parallel branches being omitted for clarity. A constant speed reference signal introduced at the input lead 133 is compared with a speed feedback signal in lead 134, giving a speed error signal in lead 135. The speed error signal is modified by a regulation multiplier 136, similar to the multipliers 51, 80, 105 shown in FIG. 1, so as to introduce the speed regulation desired in the system. Thereafter, a selected load reference signal is introduced through input 137 and superimposed upon the modified speed error signal. The modified speed error/load signal appearing in line 137a is further modified by the nonlinear compensating function generator 138 to produce a nonlinear valve positioning signal in lead 139. The valve positioning signal is compared with a valve position feedback signal 140 and produces a resultant valve positioning error signal in lead 141, which is amplified in servo amplifier 142 and serves to operate the valve with servo valve and ram 143. The valve position is sensed by position transducer 144 and compared to the desired valve position required by the input in lead 139. The steam flow characteristics of the valve are indicated by block 145. When the valve position/steam flow nonlinear function of block 145 is multiplied by the nonlinear reciprocal function of function generator 138, the resultant steam flow in line 146 is substantially linear with respect to the speed error/load signal in line 137a. The resulting steam flow operates turbine 148 driving load 149. The actual speed of turbine 148 and load 149 is measured and converted to a negative feedback signal by speed transducer 150, thus closing the speed loop.

It will be apparent that any deviation in speed will produce a speed error signal at 135, and that the overall gain of the speed loop will be influenced by the setting of the regulation control 136. However, when the turbine generator is connected to a large electrical distribution system, the turbine speed is substantially fixed. Under this condition, there will be a zero speed error signal in line 135. Since the load reference signal is added to the speed error signal at a point in the loop beyond the regulation multiplier 136, the load reference signal is unaffected by the regulation setting of 136. At a fixed system speed, the only signal going to the function generator 138 will be a desired load reference signal. In other words, a precalibrated dial can be used to apply a selected load to the turbine by applying a signal to open or close the valves to add or subtract load as desired, without the load reference signal being affected by the adjustable speed regulation of the turbine. Deviations of system frequency will still produce a speed error signal which will be compensated for by supplementary opening or closing of the valves.

Although FIG. 9 illustrates a simplified diagram for one valve, the invention contemplates the use of the separate speed/load signals to actuate parallel valve positioning branches in the single speed control loop. By means of the ability to introduce different regulation settings to the stop valves, the control valves, and the intercept valves respectively, the single speed reference source with a single speed feedback comparison signal and a single load reference source can be used to supply all of the valve positioning branches. Proper correlation of the operating ranges of the valves is obtained with the transfer circuit 121. This is used first to accomplish the transfer between the stop valve and the control valves for full and partial-arc admission respectively, and secondly to correlate the proper operating range of the intercept valve with whichever primary steam admission valve is controlling at the time. The simplicity with which the transfer is accomplished and with which the various operating ranges of the valves may be adjusted is vastly superior to prior art mechanical or hydraulic arrangements. Also, the simplicity with which the regulation of the various valves may be accomplished is superior to prior art methods.

The elimination of valve flow characteristic compensating cams is accomplished by the nonlinear function generators, which produce nonlinearities reciprocal to those of the valve characteristics. These function generators may be used to modify the valve position input signal, as they do for the stop valve and intercept valve shown. Alternatively, they may modify the feedback of the valve positioning subloop as shown in connection with the control valves. The former use is of value where one or more valves are controlled simultaneously, as might be desired with the additional stop valves or intercept valves 20, 21 indicated in FIG. 1. The use in the valve position feedback is more valuable where the valves are of different characteristics or are to be sequentially operated as in control valves.

In order to improve the operation of sequentially-operated control valves, the first-stage pressure feedback (102) will serve to substantially remove any irregularities or nonlinearities existing at the points where each individual control valve starts to open. Also, the need for cams to perform the sequencing from a common actuator is eliminated.

It will be apparent that the various features described in connection with the invention are not necessarily limited to use in a reheat turbine or in a turbine where provisions for full and partial-arc admission are present. However, the additional control complications introduced in such turbine power plants are more easily resolved by means of the improved control system shown than with prior art control systems.

While there has been described what is at present considered to be the preferred embodiment of the invention, it will be understood that various modifications may be made therein, and it is intended to cover in the appended claims all such modifications as fall within the scope of the invention.

What we claim as new and desire to secure by Letters Patent of the United States is:

1. In a control system for a prime mover supplying power to a load also supplied with power by other prime movers, the combination of:

valve means for controlling the flow of motive fluid to the prime mover,
    means supplying a first reference electric signal representing a desired normal operating speed,
    speed responsive means supplying a second electric signal representing actual prime mover speed,
    means comparing said first and second signals to supply a third electric signal representing a speed error signal,
    adjustable multiplier means modifying the speed error signal to give a desired speed regulation,
    electro-hydraulic servo means positioning said valve means in response to said modified speed error signal, and
    means supplying a fourth reference electric signal representing a desired load on the prime mover, said load signal being superimposed on the speed error signal after it has been modified by said multiplier means, whereby the load applied for a given magnitude of load reference signal is substantially the same regardless of the setting of said multiplier means.

2. The combination according to claim 1 wherein the means supplying said fourth reference electric potential includes time integrating means increasing said fourth potential at a preselected rate, and limiting means holding the fourth potential at a final preselected value, whereby a preselected load may be applied over a preselected period of time.

3. In a control system for a prime mover, the combination of:

a plurality of valves for controlling the flow of motive fluid to the prime mover,
    means supplying a first reference electric potential representing a desired normal operating speed,
    speed responsive means supplying a second electric potential representing actual prime mover speed,
    means comparing said first and second potentials to supply a third electric potential representing a speed error signal,
    a plurality of electrohydraulic servo means, each being independently connected to position one of said valves in response to an electric potential,
    means supplying said third speed error potential signal in parallel to each of said electrohydraulic servo means, and
    adjustable biasing means comprising a plurality of variable impedance devices connected to a source of electric potential, said adjustable biasing means being connected to selectively supply different electric biasing potentials to each of said electrohydraulic servo means, whereby a single speed error signal will cause the valves to be operative over different prime mover speed ranges.

4. The combination according to claim 3 wherein said plurality of valves comprise stop valve means and control valve means connected in series, and wherein said adjustable biasing means supplies a transfer biasing potential either to the servo means positioning said stop valve means or to the servo means positioning said control valve means, whereby control of the motive fluid over a given prime mover speed range can be shifted between the stop valve means and the control valve means.

5. The combination according to claim 3 wherein said plurality of valves are connected in parallel flow relation and wherein said adjustable biasing means furnishes a different magnitude of biasing potential to each of the electrohydraulic servo means positioning each of said valves, whereby the valves will be operated in sequence by the speed error signal.

6. The combination according to claim 3 wherein said plurality of valves comprise a plurality of control valves connected in parallel flow relation and stop valve means connected in series flow with said control valves, and wherein said adjustable biasing means furnishes biasing potentials of different magnitudes in each of the electrohydraulic servo means positioning each control valve, and also supplies additional transfer biasing potential either to all of the control valve positioning servo means or to the stop valve positioning servo means, whereby control of the flow of motive fluid can be shifted either to the stop valve means or to sequentially operated parallel-connected control valve means.

7. In a control system for a prime mover supplying power to a load also supplied with power by other prime movers, the combination of:
first and second valve means connected in series for controlling the flow of motive fluid to the prime mover,
means supplying a first reference electric potential representing a desired normal operating speed,
speed responsive means supplying a second electric potential representing actual prime mover speed,
means comparing said first and second potentials to supply a third electric potential representing a speed error signal,
first and second adjustable multiplier means connected in parallel to the output of said comparing means, and each modifying the speed error signal to supply first and second modified speed error signals representing first and second speed regulations,
first and second electrohydraulic servo means, each independently connected to position the first and second valve means respectively in response to said modified speed error signals,
means supplying a fourth reference electric potential representing a desired load on the prime mover, including means to superimpose said fourth potential on each of said first and second modified speed error signals, and
adjustable biasing means comprising a plurality of variable impedance devices connected to a source of electric potential, said adjustable biasing means being connected to selectively supply electric biasing potentials to the first and second electrohydraulic servo means, whereby said third speed error potential modified by the first and second multiplier means and thereafter modified by said fourth load reference potential will cause the first and second valves to operate over different ranges of prime mover speed or load.

8. In a control system for a prime mover, the combination of:
valve means having nonlinear flow characteristics for controlling the flow of motive fluid to the prime mover,
means supplying a first reference electric potential representing a desired normal operating speed,
speed responsive means supplying a second electric potential representing actual prime mover speed,
means comparing said first and second potentials to supply a third electric potential representing a speed error signal,
electrohydraulic servo means positioning said valve means in response to said speed error signal, said electrohydraulic servo means including an electrical nonlinear function generator for modifying the speed error signal so that the valve position is nonlinear with respect to said speed error signal in a reciprocal relationship to the nonlinear flow characteristics of said valve means, whereby the prime mover speed/load characteristic is substantially linear.

9. The combination according to claim 8 including adjustable multiplier means connected to the output of said comparing means and modifying the third speed error potential to give a desired speed regulation, and means supplying a fourth reference electric potential representing a desired load on the turbine, said load signal being superimposed on the speed error signal after it has been modified by the multiplier means and before it is supplied to said nonlinear servo means.

10. The combination according to claim 8 wherein said electrolyhydraulic servo means includes valve position feedback provisions, and wherein said electrical nonlinear function generator is connected in the feedback circuit of said servo means.

11. In a control system for a prime mover, the combination of:
a plurality of valves having nonlinear flow characteristics and connected in parallel flow relation to control the flow of motive fluid to the prime mover,
means supplying a first reference electric potential representing a desired normal operating speed,
speed responsive means supplying a second electric potential representing actual prime mover speed,
means comparing said first and second potentials to supply a third electric potential representing a speed error signal,
a plurality of electrohydraulic servo means, each of which is independently connected to position one of said valves in response to said speed error signal, said electrohydraulic servo means each including an electric nonlinear function generator for modifying the speed error signal so that the valve position is nonlinear with respect to the speed error signal in reciprocal relationship to the nonlinear flow characteristic of each of the respective valves, and
adjustable biasing means comprising a plurality of variable impedance devices connected to a source of electric potential, said adjustable biasing means being connected to each of said servo means and supplying electric biasing potentials of different magnitudes, whereby the speed error signal operates said parallel-connected valves sequentially with compensation for individual valve flow characteristics.

12. The combination according to claim 11 including pressure transducer means measuring the motive fluid pressure controlled by said valves and supplying a fourth electric feedback potential proportional to motive fluid pressure, and means summing said fourth feedback potential with said third speed error potential, whereby irregularities introduced by the valves sequencing are substantially removed.

13. In a control system for a prime mover supplying power to a load, also supplied with power by other prime movers,
a plurality of valves having nonlinear flow characteristics and connected in parallel flow relationship to control the flow of motive fluid to the prime mover,
means supplying a first reference electric potential representing a desired normal operating speed,
speed responsive means supplying a second electric potential representing actual prime mover speed,
means comparing said first and second potentials to supply a third electric potential representing a speed error signal.
adjustable multiplier means modifying the speed error signal to give a desired speed regulation,
a plurality of electrohydraulic servo means, each of which is independently connected to position one of said valves in response to said modified error signal after it has passed through the multiplier means, each of said electrohydraulic servo means including an electrical nonlinear function generator for further modifying the speed error signal so that the valve position is nonlinear with respect to the speed error signal in reciprocal relationship to the nonlinear flow characteristics of each of the respective valves,
means supplying a fourth reference electric potential representing a desired load on the prime mover, including means to superimpose said fourth potential on the third speed error potential after it has been modified by the multiplier means, and
adjustable biasing means comprising a plurality of variable impedance devices connected to a source of electric potential, said adjustable biasing means being connected to supply electric biasing potentials of different magnitudes to each of said electrohydraulic servo means, whereby said parallel-connected valves are operated sequentially in response to the speed error signal to provide substantially linear motive fluid flow relationship with a selected speed regulation determined by the multiplier means, and whereby the load may be separately controlled with the fourth electric potential by adjusting said valves independently of the speed error signal.

14. The combination according to claim 13, including pressure transducer means measuring the pressure of motive fluid controlled by said valves, and supplying a fifth electric potential representing motive fluid pressure, said fifth potential also being superimposed on the speed error signal after it has been modified by the multiplier means.

15. A reheat steam turbine driving a generator connected to an electrical load supplied by other generators, comprising a first high-pressure turbine section supplied with high-pressure steam, a lower-pressure turbine section, means reheating the steam between the high-pressure and lower-pressure turbine sections, a plurality of control valves connected in parallel and controlling the flow of high-pressure steam to the high-pressure section, a stop valve connected to control the flow of steam to said control valves, an intercept valve connected to control the flow of reheated steam to the lower-pressure turbine section, said valves all having nonlinear flow characteristics, a plurality of electrohydraulic servo means each independently connected to position one of said valves in response to an electric input potential, said electrohydraulic servo means including electrical nonlinear function generators for modifying said valve input potentials so that the valve positions are nonlinear with respect to the input potentials in reciprocal relationship to the nonlinear flow characteristics of each respective valve, means supplying a first reference electric potential representing a desired normal operating speed of the turbine, speed responsive means supplying a second electric potential representing actual turbine speed, means comparing said first and second potentials to supply a third electric potential representing a speed error signal; first, second, and third adjustable multiplier means connected in parallel to the output of said comparing means and each modifying the third speed error potential to supply first, second and third modified speed error signals representing first, second and third valve speed regulations, said first, second and third modified speed error signals being connected to the servo means operating the stop valve means, the control valves, and the intercept valve means respectively, means supplying a fourth reference electric potential representing a desired load on the turbine and superimposing said fourth potential on the first and second modified speed error signals, first adjustable biasing means furnishing a first biasing potential and connected to superimpose said first biasing potential either on the first modified error signal or on the second modified error signal, whereby control of the high-pressure steam may be shifted between the stop valve and the control valves, second adjustable biasing means supplying a second biasing potential and connected to superimpose said second biasing potential on the third modified speed error signal so as to adjust the speed range of operation of the intercept valve with respect to either the stop valve or the control valves, and third adjustable biasing means connected to supply a plurality of third biasing electric potentials of different magnitudes to the control valve servo means, whereby the control valves are sequentially operated as the second modified speed error signal changes.

No references cited.